(12) United States Patent
Micacchi

(10) Patent No.: US 9,687,997 B2
(45) Date of Patent: Jun. 27, 2017

(54) SAW TOOTH FOR CIRCULAR SAW

(76) Inventor: Maurice Micacchi, Woodstock (CA)

( * ) Notice: Subject to any disclaimer, the term of this patent is extended or adjusted under 35 U.S.C. 154(b) by 1490 days.

(21) Appl. No.: 13/409,809

(22) Filed: Mar. 1, 2012

(65) Prior Publication Data
US 2012/0291919 A1 Nov. 22, 2012

Related U.S. Application Data

(60) Provisional application No. 61/487,328, filed on May 18, 2011.

(51) Int. Cl.
| | |
|---|---|
| *B27G 13/10* | (2006.01) |
| *A01G 23/091* | (2006.01) |
| *B27B 33/08* | (2006.01) |
| *B02C 18/18* | (2006.01) |
| *B23C 5/20* | (2006.01) |

(52) U.S. Cl.
CPC ........... *B27G 13/10* (2013.01); *A01G 23/091* (2013.01); *B27B 33/08* (2013.01); *B02C 18/182* (2013.01); *B23C 5/202* (2013.01); *B23C 5/207* (2013.01)

(58) Field of Classification Search
CPC .. A01G 23/093; A01G 23/067; B02C 18/184; B02C 18/182; B02C 18/146; B02C 18/06; B02C 18/18; B02C 18/186; B02C 13/2804; B02C 7/12; B23C 2210/165; B23C 5/207; B23C 5/202; B23C 5/2204; B23C 5/2208; B23C 5/20; B23C 5/205; B27G 13/02; B27G 13/04; B27G 13/10; A02G 23/091; B27B 33/08
USPC ............... 83/840–844, 955; 407/48, 103, 65, 407/113–116
See application file for complete search history.

(56) References Cited

U.S. PATENT DOCUMENTS

| | | | |
|---|---|---|---|
| 869,574 | A | 10/1907 | Huther |
| 2,702,698 | A | 2/1955 | Snyder et al. |
| 2,736,352 | A | 2/1956 | Wright |
| 2,913,024 | A | 11/1959 | Edward |
| 3,261,384 | A | 7/1966 | Henderson |
| 3,358,720 | A | 12/1967 | Henderson |

(Continued)

FOREIGN PATENT DOCUMENTS

| | | |
|---|---|---|
| EP | 873808 | 10/1988 |
| JP | 59134612 | 8/1984 |
| WO | WO 2008092239 A1 * | 8/2008 |

OTHER PUBLICATIONS

International Search Report, dated Apr. 29, 2008, issued in corresponding International Application No. PCT/CA2008/000066.

(Continued)

*Primary Examiner* — Matthew G Katcoff
(74) *Attorney, Agent, or Firm* — Ostrolenk Faber LLP

(57) ABSTRACT

A tooth is provided for a circular disc felling saw. The saw tooth may have a generally square pyramidal shape with tips at each of the four corners. Each of the tips has an enlarged tip region where the tip is stepped outward from the adjacent sides. The front face of the tip remains smoothly continuous. The enlarged, or built-out region extends rearwardly a greater distance than the lateral step out distance, and the rearward build-out portion is relieved on planes parallel to the main portions of the planar sides of the pyramid. The tooth may have both leading and trailing cutting tips. Either one or both of the primary and secondary cutting tips may include a wear insert, such as a ceramic wear insert.

33 Claims, 16 Drawing Sheets

(56) References Cited

U.S. PATENT DOCUMENTS

| | | |
|---|---|---|
| 3,575,467 A | 4/1971 | Davis |
| 3,818,561 A | 6/1974 | Montana et al. |
| 3,945,289 A | 3/1976 | Baes Rios |
| 3,977,447 A | 8/1976 | Pease |
| 3,986,421 A | 10/1976 | Schultz |
| 4,084,470 A | 4/1978 | Reed |
| 4,557,172 A | 12/1985 | Yoneda |
| 4,563,929 A | 1/1986 | Ringlee et al. |
| 4,690,024 A | 9/1987 | Chaconas |
| 4,738,291 A | 4/1988 | Isley |
| 4,744,278 A | 5/1988 | Wright |
| 4,750,396 A | 6/1988 | Gaddis et al. |
| 4,765,217 A | 8/1988 | Ludwig |
| 4,848,205 A | 7/1989 | Suzuki et al. |
| 4,879,936 A | 11/1989 | Anderson |
| 4,883,129 A | 11/1989 | Lonn et al. |
| 4,932,447 A | 6/1990 | Morin |
| 5,085,112 A | 2/1992 | MacLennan |
| 5,088,371 A | 2/1992 | MacLennan |
| 5,131,305 A | 7/1992 | MacLennan |
| 5,205,199 A | 4/1993 | MacLennan |
| 5,209,611 A | 5/1993 | Drescher |
| 5,303,752 A | 4/1994 | MacLennan |
| 5,307,719 A | 5/1994 | MacLennan |
| 5,481,952 A | 1/1996 | MacLennan |
| 5,579,674 A * | 12/1996 | Wildey .................. 83/835 |
| 5,644,965 A | 7/1997 | MacLennan et al. |
| 6,053,672 A * | 4/2000 | Satran et al. .................. 407/40 |
| 6,601,495 B2 | 8/2003 | Cranna |
| 6,725,758 B2 | 4/2004 | MacLennan et al. |
| 6,810,783 B1 | 11/2004 | Larose |
| 7,713,006 B2 | 5/2010 | MacLennan et al. |
| 2002/0002892 A1 | 1/2002 | DiSabatino |
| 2004/0244560 A1 | 12/2004 | Krehel |
| 2006/0208120 A1* | 9/2006 | McGehee .............. B27G 13/10 241/294 |
| 2007/0151430 A1 | 7/2007 | MacLennan et al. |
| 2009/0238649 A1* | 9/2009 | Kruszynski et al. ........... 407/40 |
| 2010/0011934 A1 | 1/2010 | Micacchi |

OTHER PUBLICATIONS

International Preliminary Report on Patentability, dated Aug. 4, 2009, issued in corresponding International Application No. PCT/CA2008/000066.

Tankersley, Mike: "Southern Loggin Times", Jun. 1992, Cover page and pp. 14-15, 44 and 45.

* cited by examiner

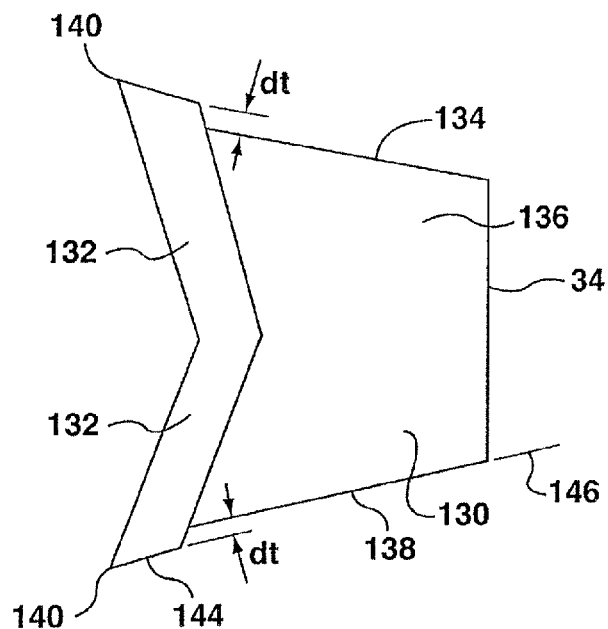
FIG. 5a
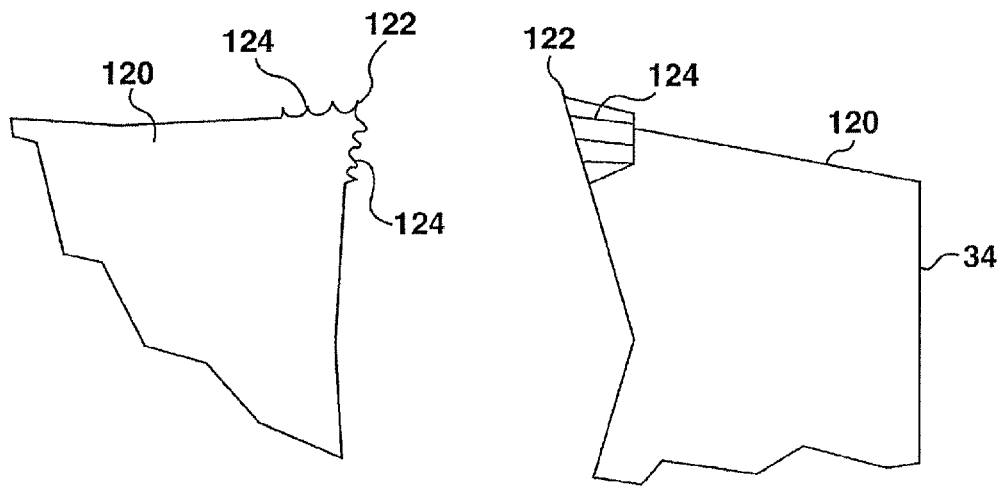
FIG. 5b
FIG. 5c

SAW TOOTH FOR CIRCULAR SAW

This application claims the benefit of priority under 35 U.S.C. §119 of U.S. Provisional Patent Application Ser. No. 61/487,328 filed May 18, 2011, the specification and drawings of which are hereby incorporated by reference in their entirety.

FIELD OF THE INVENTION

The present invention relates to saw teeth for circular saws.

BACKGROUND OF THE INVENTION

Saw teeth for circular saws of the type mounted on a feller head for a tree felling apparatus are known. U.S. Pat. No. 4,932,447, Morin, 1990, and U.S. Pat. No. 5,205,199, MacLennan, 1993, represent saw teeth that have become well known in the industry. Morin '447 and MacLennan '199 both teach a replaceable saw tooth with four sides. The teeth can be rotated when the active cutting tips and edges become dull or worn.

Saw teeth wear relatively quickly and may become rounded or dull. This may cause increased fuel consumption, decreased productivity, or poor cut quality, or all of them, and may tend to result in a need for maintenance. The cutting tips do the majority of the cutting of the tree fibers and even though the teeth may have large cutting tips, only a small area at the end of the tip is used. As the tip wears it may tend to become rounded and the tooth body immediately behind the end of the tip may then present the outermost part of the tooth.

Good design of saw teeth have the front or leading cutting edges of the tooth as the widest part of the tooth so that the leading cutting edge can cut the tree fibers and the trailing part of the tooth is tapered so that the tooth surface is relieved behind the leading cutting edges so the trailing part of the tooth doesn't contact the tree and cause friction and loss of energy of the saw blade. FIGS. 1a-1f, and, in particular FIGS. 1e and 1f, show a prior art tooth in both new and worn conditions.

The width of the saw cut or dimension at the widest part of the leading cutting edge is called the kerf. As conventional saw teeth wear, the leading cutting edges tend to become rounded and the tooth body immediately behind the leading edge may then be the thickest part of the tooth. See FIG. 1f. When cutting with a dull conventional saw tooth as described above, the narrower cutting tips cut an initial kerf and the thicker trailing tooth body has to be pushed through the initial kerf of the tree as the blade feeds through the tree, pushing and tearing the tree fiber above and below the initial kerf to create a wider final kerf equal to the width of the trailing tooth body thereby causing increased friction and loss of blade energy. This may tend to consume more energy, decrease machine productivity and produce a rougher cut on the tree butt. A dull tooth may impose higher forces and stresses on the saw blade than a sharp tooth.

Conventional four-sided rotatable saw teeth have cutting edges are planar (that lie in one plane). See FIG. 1a. While these conventional saw teeth are easy to manufacture, as they wear the tend to become dull and rounded as described above. The width of the leading cutting edge portion of the tooth body is worn thinner than the tooth body behind the leading edge causing increased friction, inefficient cutting and excessive loss of blade energy which results in more fuel being consumed.

SUMMARY OF THE INVENTION

In an aspect of the invention there is a tooth assembly for releasable mounting to a circular saw disc. The tooth has a generally square-pyramidal body with a mounting end and a front end distant from the mounting end. At least one primary cutting tip is located at the front end. The cutting tip is locally enlarged to extend proud of the adjacent substantially planar sides of the tooth.

In another aspect of the invention there is a saw tooth releasably mountable to tooth seat of a circular saw disc of a feller head, and when so mounted, the tooth is operable to cut wood when driven in a direction of forward travel. The tooth has a body with a mounting end and a front end distant from the mounting end. The body is wider at the front end than at the mounting end. The body has at least a first cutting tip and a second cutting tip located at the front end. The body is repositionable on the tooth seat by angular re-orientation about the direction of forward travel. As viewed in the direction of forward travel, the first tip is locally enlarged relative to the body generally transversely to the direction of forward travel.

In a feature of that aspect of the invention, the tooth body has a plurality of sides defining a generally pyramidal form between the front end and the rear end, the plurality of sides including a first side and a second side, the first side lying in a first surface, the second side lying in a second surface. The first surface and the second surface intersect along a first line of intersection. The front end of the tooth defines a third surface. The first surface and the third surface intersect at a second line of intersection. The second surface and the third surface intersect at a third line of intersection. The first, second, and third lines of intersection extend away from the first tip. The body has a region of enlargement adjacent the first tip. In the region of enlargement the third surface extends outwardly beyond the second line of intersection and the third line of intersection.

In another feature, as seen parallel to the direction of forward travel, in the region of enlargement the third surface extends beyond the first surface a first projected distance. In the region of enlargement the third surface extends beyond the second surface a second projected distance. The enlarged region extends rearwardly from the third surface a rearward distance parallel to the first line of intersection greater than twice any of (a) the first projected distance; and (b) the second projected distance. In a further feature, the rearward distance is in the range of 2 to 5 times the greater of the first projected distance and the second projected distance. In still another feature, the tooth has a second enlarged region associated with the second tip. The second vertex deviates rearwardly between the first and second tips. The second vertex has a medial portion between the first and second tips at which the third surface terminates at the second vertex. In still another feature, the tooth has a second tip lying at a distant end of the second vertex. The enlarged region extends continuously between the first and second tips along the second vertex. In yet another feature, the tooth has an enlarged region at each the tip. In still another feature, the body has a secondary tooth mounted rearwardly of the first tip. In still yet another feature, the second vertex extends across the tooth from the first tip to the second tip; and the enlarged region associated with the first tip extends along the second vertex a distance that is at least ⅛ of the overall arc length of the second vertex.

In a further feature, any tip of the tooth includes a wear insert mounted thereto, the wear insert conforming to any associated enlarged region. In still another feature, the tooth has four the tips each having a respective enlarged region associated therewith, and the body is substantially square in cross-section perpendicular to the direction of forward travel. In a further feature the tooth has secondary teeth mounted in respective trailing positions rearwardly of each of the tips. In still another feature the enlarged region is rearwardly relieved on planes parallel to respective planes of the first and second surfaces. In a further feature each of the first and second projected distances is at least 1/16".

In still another feature, or combination of features, of that aspect of the invention, the tooth body has a plurality of sides defining a generally pyramidal form between the front end and the rear end, the plurality of sides including a first side and a second side, the first side lying in a first surface, the second side lying in a second surface. The first surface and the second surface intersect along a first line of intersection. The front end of the tooth defines a third surface. The first surface and the third surface intersect at a second line of intersection. The second surface and the third surface intersect at a third line of intersection. The first, second, and third lines of intersection extend away from the first tip. The body has a region of enlargement adjacent the first tip. In the region of enlargement the third surface extends beyond the first surface a first projected distance that is at least 1/16". In the region of enlargement the third surface extends beyond the second surface a second projected distance that is at least 1/16". The enlarged region extends rearwardly from the third surface a rearward distance parallel to the first line of intersection a distance in the range of 2 to 5 times each of (a) the first projected distance; and (b) the second projected distance. There is a respective vertex that extends between each adjacent pair of tips, each vertex deviates rearwardly between that pair of tips; and each vertex has a medial portion between its associated tips at which the third surface terminates such that, when viewed toward the front face along the direction of forward travel the tooth has a crenelated appearance.

In another aspect of the invention there is a rotatable saw blade tooth for use on a forestry feller buncher saw blade. The tooth is mountable to a tooth seat of the saw blade. When mounted on the tooth seat, the tooth is movable in a direction of forward travel as the saw blade turns, so as to cut a tree. The saw blade tooth has a tooth body having a generally square pyramidal shape including a front end, a rear end, and first, second, third and fourth sides lying in respective first, second, third and fourth planes. The rear end has a mounting removably engageable with the tooth seat and rotatable about the direction of forward travel to a plurality of different seating orientations. Each of the first, second, third, and fourth sides is substantially trapezoidal in shape and tapers in width from the front end to the rear end. A first tip is formed at the meeting of the first and second sides and the front end. A second tip is formed at the meeting of the second and third sides and the front end. A third tip is formed at the meeting of the third and fourth sides and the front end. A fourth tip is formed at the meeting of the fourth and first sides and the front end. The front end is rearwardly sloped away from each of the first, second, third, and fourth tips. The tooth body has a central axis of symmetry extending longitudinally the direction of forward travel. A first transverse axis lies in a plane perpendicular to the first and third sides. A second transverse axis lies in a plane perpendicular to the second and fourth sides. The first and second transverse axes are perpendicular to the central axis of symmetry and define a cross-sectional plane of the tooth body. Each of the first, second, third, and fourth tips has an associated first, second, third and fourth region of local enlargement. The first region of local enlargement includes material that extends transversely proud of (i.e., beyond) the first and second planes.

In a feature of that aspect of the invention, a secondary cutting tooth is mounted in a trailing position with respect to each of the tips. In another feature, each of the enlarged regions has a forward face smoothly continuous with the front end of the tooth body. In still another feature, each of the enlarged regions extends at least one eighth of the tip-to-tip distance across the tooth and at least twice as far rearwardly in the direction along the central axis of symmetry.

In a combination of features of that aspect of the invention, each the region of enlargement extends beyond the associated pair of first, second, third, and fourth planes a projected distance that is at least 1/16". The enlarged region extends rearwardly a rearward distance in the range of 2 to 5 times the projected distance. There is a respective vertex that extends between each adjacent pair of tips. Each vertex deviates rearwardly between the respective associated pair of tips. Each vertex has a medial portion between its associated tips at which the third surface terminates such that, when viewed toward the front face along the direction of forward travel the tooth has a crenelated appearance.

These and other aspects and features of the invention may be understood by considering the accompanying illustrations and the detailed description provided herein below.

BRIEF DESCRIPTION OF THE DRAWINGS

FIG. 2b is a top view of the tooth of FIG. 2a;

FIG. 2c is a front view of the tooth of FIG. 2a;

FIG. 4a is a perspective view of an alternate embodiment tooth to that of FIG. 2a;

FIG. 4b is a different perspective view of the tooth of FIG. 4a;

FIG. 4c is a side view of the tooth of FIG. 4a;

FIG. 4d is a front view of the tooth of FIG. 4a;

FIG. 5a is a side view of an alternate embodiment of saw tooth to that of FIG. 2a;

FIG. 5b is a side view detail of a further alternate embodiment to the saw tooth of FIG. 2a;

FIG. 5c is a front view detail of a further alternate embodiment of the saw tooth of FIG. 5b;

FIG. 5d is a side view detail of a further alternate embodiment to the saw tooth of FIG. 2a.

DETAILED DESCRIPTION

Figure 1A:
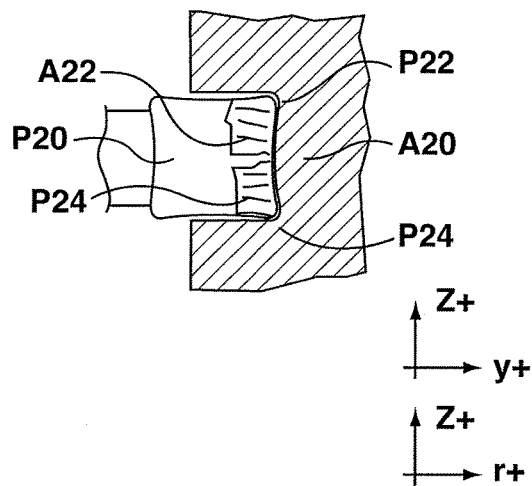
FIG. 1a is a section of sharp prior art tooth, as the tooth cuts a tree, looking toward the front of the tooth.

The description that follows, and the embodiments described therein, are provided by way of illustration of an example, or examples of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

It may be helpful to identify co-ordinate systems that may aid in understanding the present invention. At the largest level, there may be a cylindrical polar co-ordinate system, in which the axial, or x-direction is defined by the axis of rotation of a feller buncher disc saw blade. The circumferential direction is that through which angles, angular velocity, and angular accelerations, (typically .theta., $\theta$, .omega. $\omega$, and .alpha.$\alpha$) may be measured, most often from an angular datum, or angular direction, in a plane perpendicular to the axial direction, and a radial direction. The radial direction is defined in the plane to which the axial direction is normal, extending away from the axial centerline of the disc. At a more local scale, that of an individual tooth, there may be an x direction, defined as being the distance in the direction of advance of the tooth into the wood that it is cutting, that direction being, instantaneously, the circumferential direction of the disc, and the velocity being the angular velocity at that radius. The y-direction is the perpendicular direction, namely the direction of advance into the tree of the axis of rotation of the disc on which the tooth is mounted. The z-direction is the mutually perpendicular direction, across the width of the cutting face of the tooth, which, for a straight, upstanding tree is also, approximately, the vertical axis.

Figure 1C:
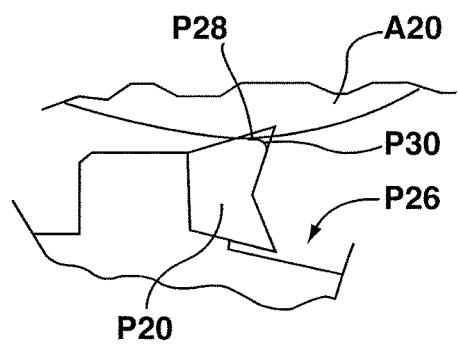
FIG. 1c shows the tooth of FIG. 1a in a worn condition, from the same view as FIG. 1b.
Figure 1B:
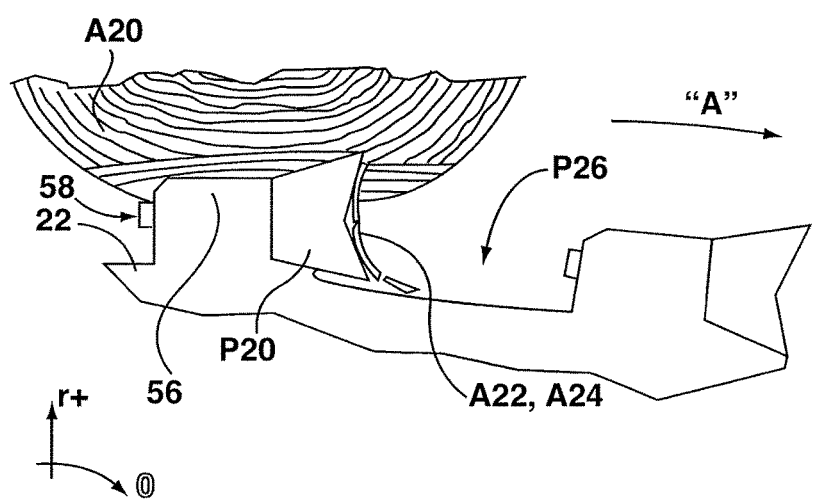
FIG. 1b is a view looking downward on the tooth of FIG. 1a as it cuts the tree.
Figure 1D:
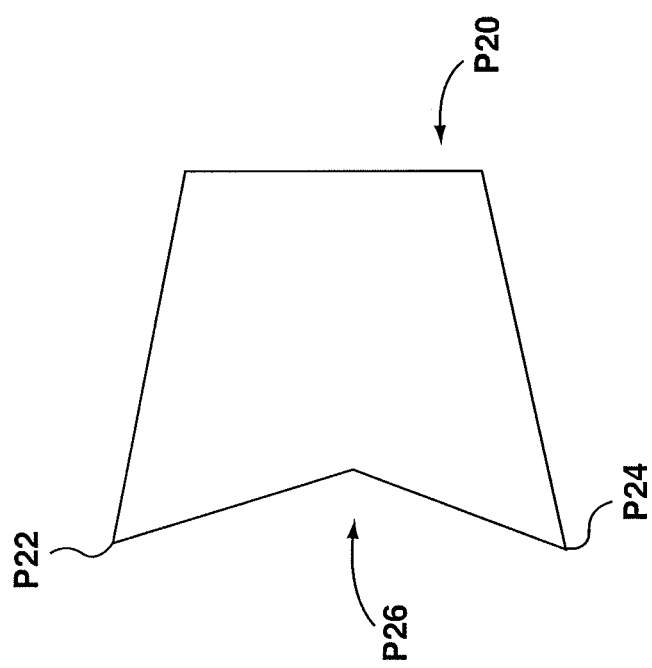
FIG. 1d is a simplified view of a typical prior art tooth, in profile.
Figure 1E:
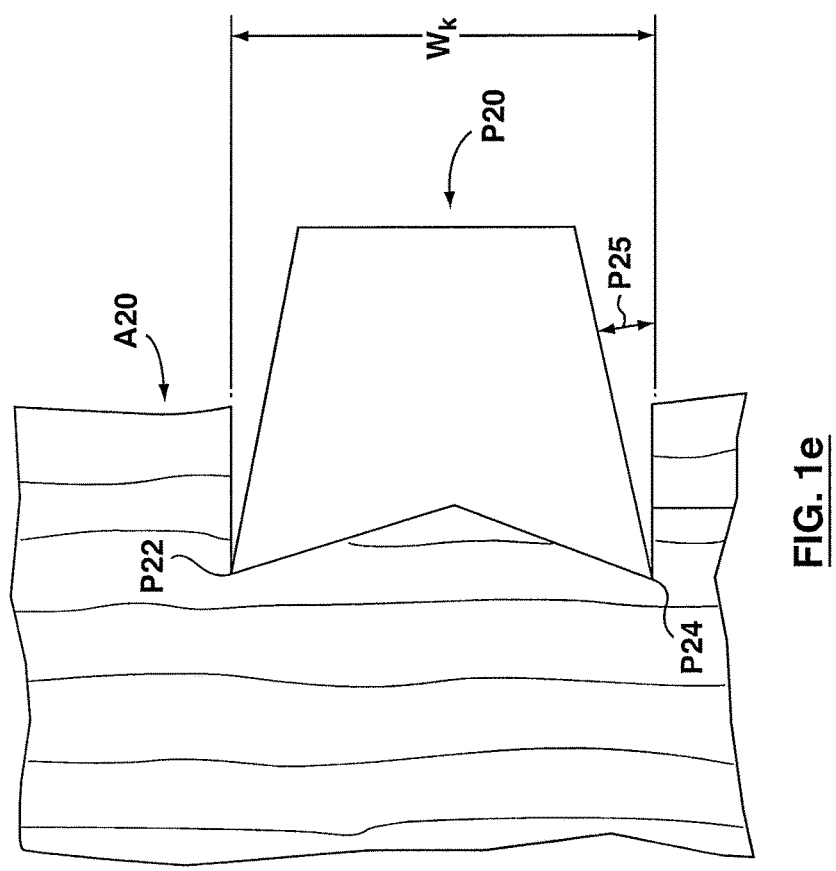
FIG. 1e shows a view of the tooth of FIG. 1d cutting cross-wise into a tree.
Figure 1F:
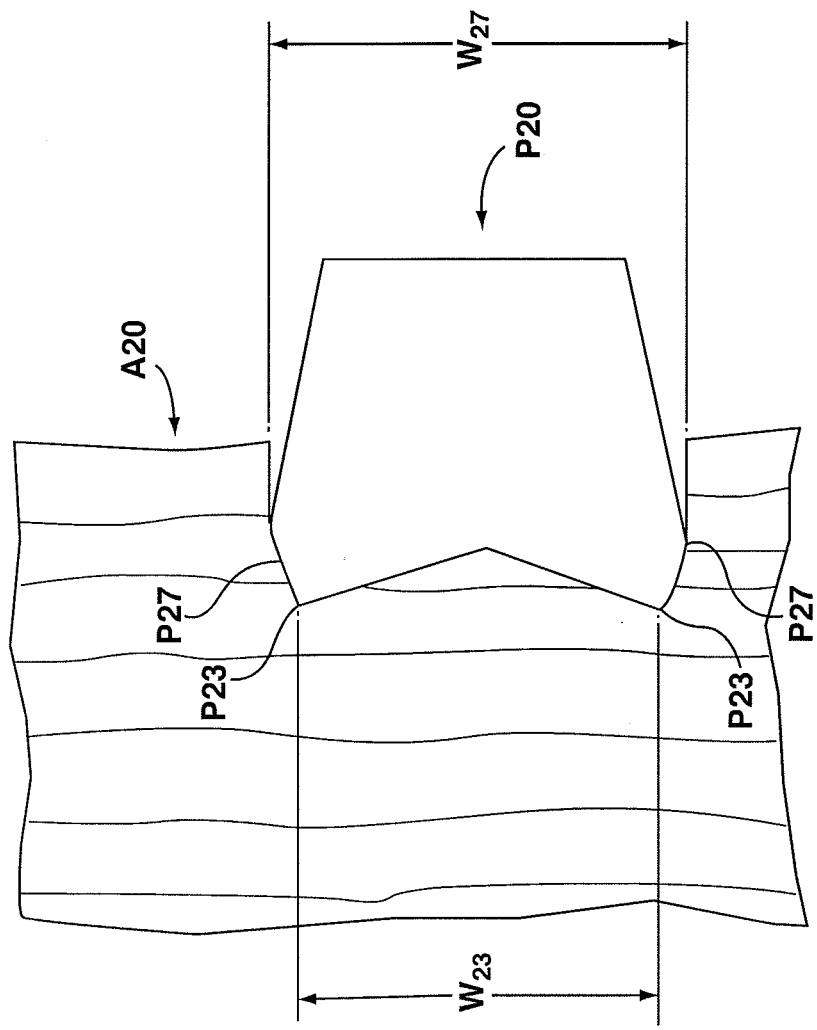
FIG. 1f shows the tooth of FIG. 1e in a worn condition.

FIGS. 1a-1e shows a prior art tooth P20 with sharp outermost front cutting tips P22 and P24 in the process of cutting portions of a tree A20. The kerf of a new tooth with a rearwardly tapering body and rearward clearance in the kerf is shown in FIG. 1e. The width of the kerf is shown as $W_K$. The trailing part of the tooth is tapered (i.e., rearwardly narrowing) along a rearward relief angle, indicated at P25. The tree fiber or chips being cut are indicated as A22 and A24. Tooth P20 has four cutting tips at the front end of the tooth. The two outermost cutting tips P22 and P24 at the front end do the majority of the cutting of the tree fibers. Although tooth P20 has relatively large cutting tips, only a small area at the end of the tip tends to be used. As the tip wears, as shown in FIG. 1f, it has a tendency to become rounded as at P23 and the tooth body immediately behind the end of the tip becomes the outermost part of the tooth as at P27. It may tend to contact the tree before the dull or the rounded cutting tip. The worn cutting tips may then tend to cut an initial kerf, as indicated by $W_{23}$, that is narrower than the trailing part of the tooth body. The final kerf, as indicated by $W_{27}$, is a rough-cut caused by pushing the wider tooth body through the initial kerf. This may result in greater friction, and in a tendency to tear tree fibers instead of cutting them with a shearing action. FIG. 1b shows tooth P20 from above, with sharp outermost front cutting tip P22 shearing the tree fibers, perhaps relatively cleanly, with cutting chips A22 and A24 turning into (and out of) gullet P26. FIG. 1c shows the prior art tooth P20 in a worn condition with a dull or rounded outermost front cutting tip P22 making contact with tree A20 along the unsharpened outside face, as at P28, rather than on the intended edge of the dulled leading edge portion P30. The original profile of the sharp cutting tip P22 is shown in dashed line, which corresponds to the shape of the tooth as shown in FIG. 1b. Of course, when the tips in question become dull, the machine may be stopped, and the teeth rotated about their longitudinal axis (i.e., the axis parallel with the instantaneous tangent defining the direction of advance of the tooth into the wood as it cuts) to present the remaining newly sharpened teeth to the wood that is to be cut. If the two radially outermost (relative to the feller disk blade 22) teeth are worn, then the tooth, being a rotatable tooth, can be rotated 180 degrees about the longitudinal axis to present the two (formerly) radially innermost tips. It is desirable for the tooth tips to last a fair length of time before it is necessary to rotate the teeth.

Figure 2A:
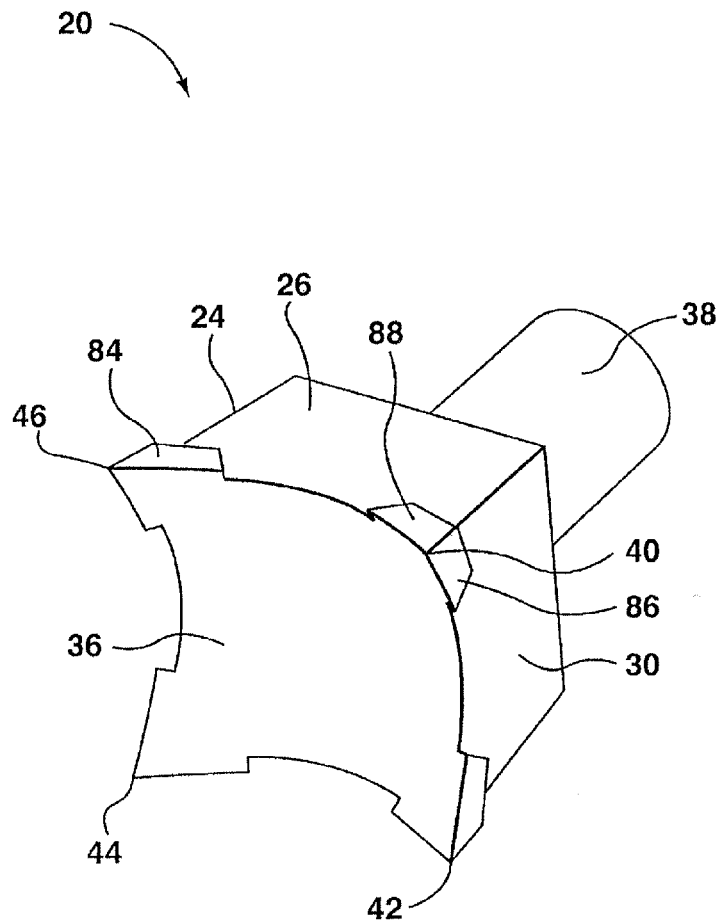
FIG. 2a is a perspective view of an example of a saw tooth according to an aspect of the present invention.

FIG. 2a is a perspective view of an embodiment of tooth or tooth assembly, referred to as tooth 20 for mounting on a disc saw blade 22 (FIG. 1b). Tooth 20, and the other embodiments of teeth herein, may be taken as having a steel body of such steel composition as is customary for feller-buncher saw teeth. Saw blade 22 has the general form of a disc, and is mounted to be driven about an axis of rotation in the direction indicated by arrow 'A'. Tooth 20 has a body 24 that has lateral sides 26, 28, an outer side 30, an inner side 32, a mounting end, stop, abutment, or shoulder 34; a front, or cutting end 36. A shank 38 may extend from the mounting end or shoulder 34 in a direction away from cutting end 36, and may seat in a corresponding accommodation, or socket, in blade 22. To the extent that tooth 20 is symmetrical about both its vertical and horizontal central planes, as indicated in FIG. 2c, it is arbitrary which sides are designated as lateral, inner, or outer. Being symmetrical, tooth 20 may be installed on blade 22 in any of four orientations, and may be rotated accordingly when the various tips become worn.

Figure 2B:
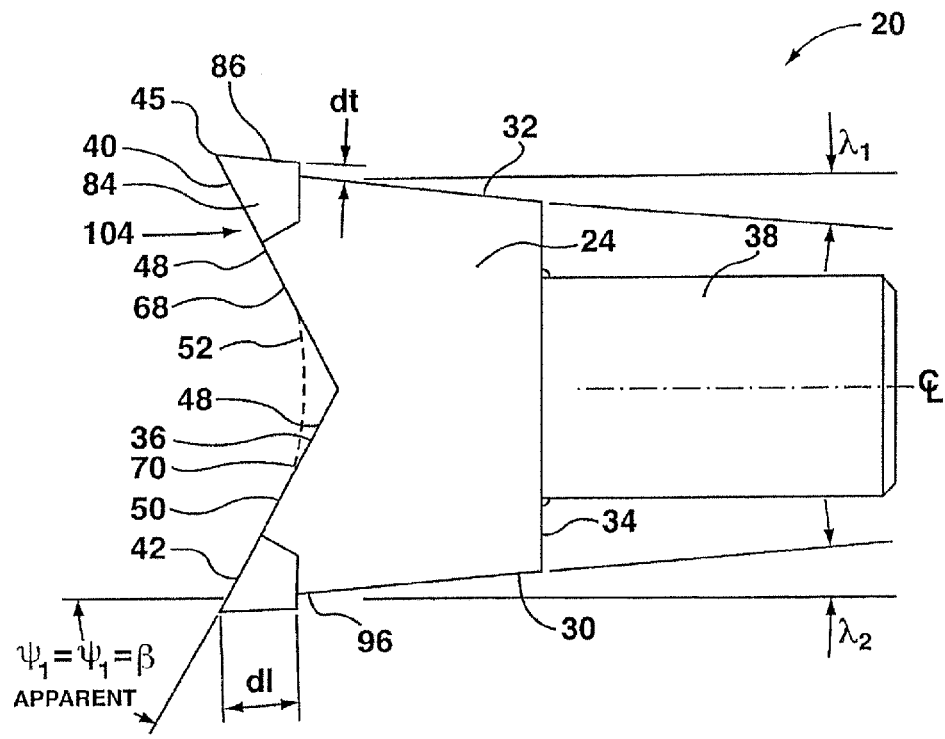
Figure 2C:
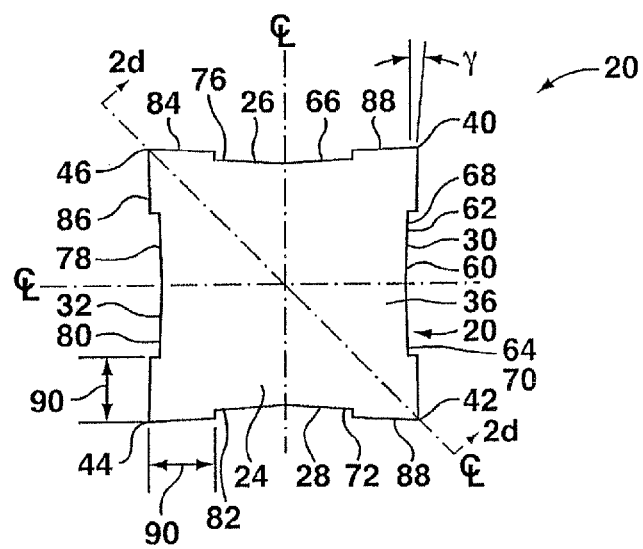
Figure 2D:
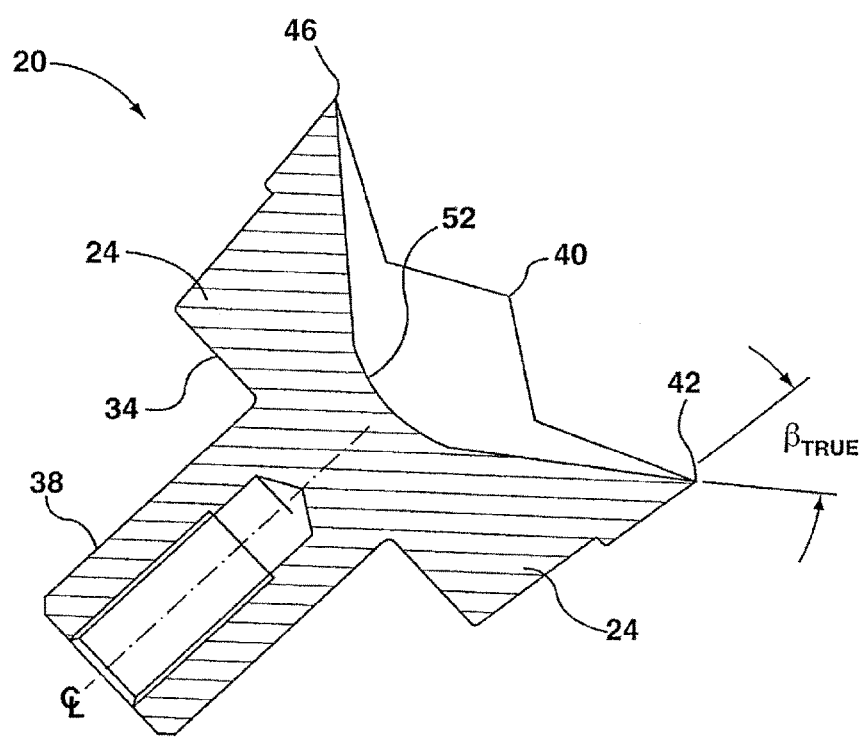
FIG. 2d is a view of on section '2d-2d' of FIG. 2c.

When seen from in front, as in FIG. 2c, and from above as in FIG. 2b, the intersection of the front end 36 with the lateral sides 26, 28 and the outer side 30 form two cutting tips 40, 42 at the outermost radius 45 (i.e., on the outermost circumferential periphery of a saw blade 22). Tips 40, 42 may be designated as upper and lower, or first and second cutting tips. Lateral sides 26, 28 extend from cutting tips 40, 42 toward inner side 32 at which there are a further two cutting tips 44 and 46. Inner portion 48 of the front end 34 is angled toward the direction of rotation of the disc as indicated at angle .beta. $\beta$ (apparent) and may, optionally, be joined to the outer portion 50 of front end 36 with a radius, as at 52, to encourage a relatively smooth flow of chips from the cutting tips to the adjacent gullet P26 of the disc saw blade 22. True angle .beta. $\beta$ is seen in FIG. 2d, and may be in the range of 35 to 55 degrees, and, in one embodiment, may be about 45 degrees. Both the inner and outer tangential portions 48, 50 of front end 36 lying to either side of radius 52 may be angled, and, while the angles may not be equal, in one embodiment they are equal, or substantially equal, both being angle .beta. $\beta$. The inner side 32 of the tooth body may abut the radially outwardly facing circumferentially extending portion of blade 22 adjacent gullet P26, and, given the planar relationship of the two parts, may tend to act as a seat on the disc to prevent rotation. Shank 38 may seat in a female socket formed in lug 56 of blade 22, lug 56 defining the radial extremity of the disc portion of blade 22. Shank 38 may be shorter than the circumferential extent of lug 56, and may be threaded internally, such that it may receive a threaded fastener 58, such as a cap screw, and may be secured in place accordingly.

FIGS. 2a to 2f show tooth 20 in detail, as uninstalled. The intersection of front end 36 with the lateral sides 26, 28 and the outer side 30 form the two cutting tips 40, 42 at outermost radius $R_1$ of saw blade 22. Outer side 30 may itself be centrally relieved as at 60, having a valley shape between two flank portions 62, 64 that are angled as at angle .gamma.γ, as seen in FIG. 2c, and in which the leading edges of those flank portions are rearwardly relieved or raked at angles and .phi$_1$, $\psi_1$, and .phi$_2$, $\psi_2$, which may be equal in magnitude, as seen best in FIG. 2b. In this geometry there are four cutting edges 66, 68, 70 and 72, 66 and 72 being the leading cutting edges of faces or sides 26, 28 respectively, and edges 68 and 70 being the upper and lower leading edges of portions 62 and 64 of radially outer side 30. In addition to the inward, rearwardly running cutting tip rake angle as at $\psi_1$ and $\psi_2$, tips 40, 42 are also rearwardly relieved on external side 30. Further still, lateral sides 26, 28 may be rearwardly relieved in the direction of circumferential motion, as indicated by rake angle lambda$_1$, $\lambda_1$ and lambda$_2$, $\lambda_2$ It may be convenient for $\lambda_1$ and $\lambda_2$ to be equal.

In this embodiment there is a tooth assembly, (e.g., tooth 20), for a cutting saw blade 22. The tooth assembly is releasably mounted to the periphery of a circular saw disc by fastener 58. Tooth 20 includes a body that may diverge in the circumferentially forward direction (on relief angles $\lambda_1$ and $\lambda_2$ as seen looking in the radial direction as in FIG. 2b), one outer side 30, that diverges circumferentially forwardly (or longitudinally forwardly, as may be) on relief angle, and one inner side 32. The intersection of the front end 36 with the lateral sides and the outer side form two cutting tips 40, 42 and four cutting edges 66, 68, 70, and 72, the front end 36 being concave, with a cylindrical shank 38 attached to the mounting end 34 of the tooth body 24 extending generally along a tangential axis to the disc (the x-axis in terms of the tooth), the shank being threaded to provide a fitting in the nature of an attachment, or attachment means, by which to secure tooth 20 to the circular saw disc. Similarly, the intersection of the front end with the lateral sides and the inner side 32 form two cutting tips 44, 46 and four cutting edges 76, 78, 80, and 82. When tips 40 and 42 are worn, tooth 20 may be extracted, and rotated 180 degrees, to present tips 44 and 46 to the material to be cut.

Figure 2E:
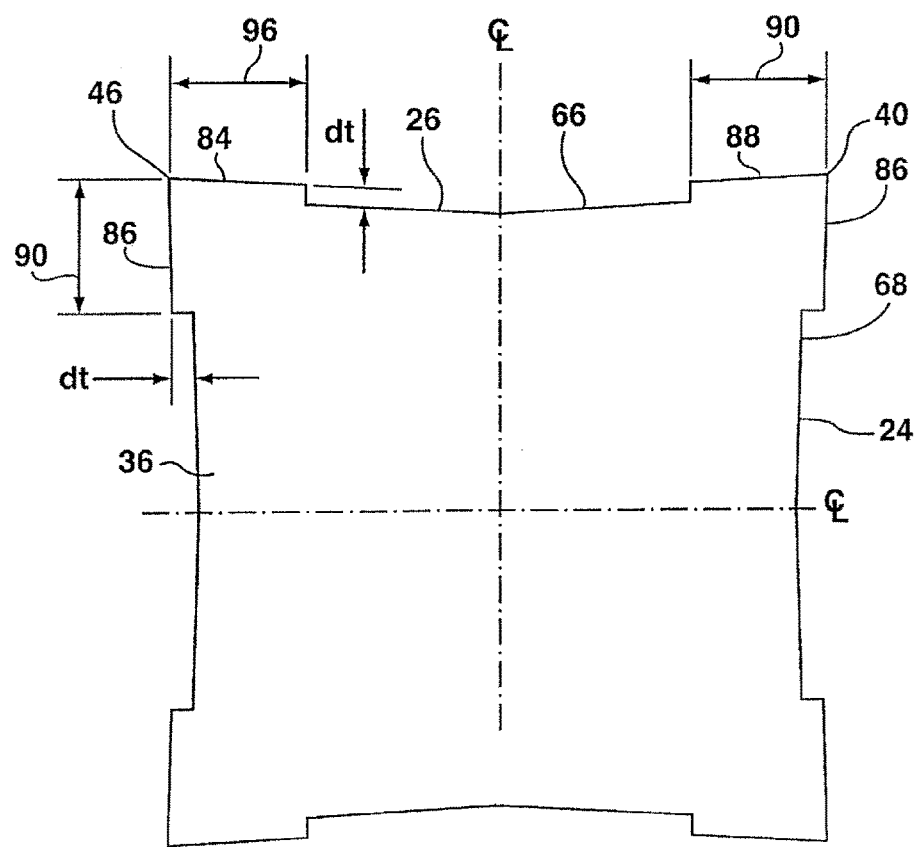
FIG. 2e shows an enlarged front view detail of the tooth of FIG. 2d.
Figure 2F:
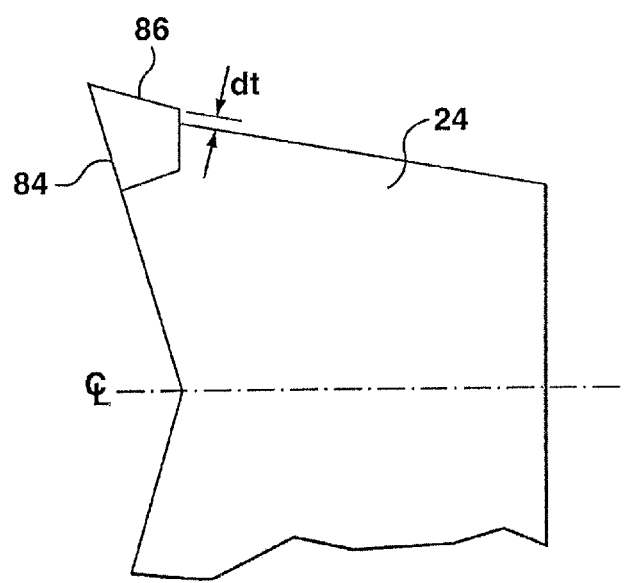
FIG. 2f shows an enlarged side view detail of the tooth of FIG. 2d.

It may be noted that the corners 40, 42, 44, 46 of tooth 20 have the form of being crenellated when viewed from the front. That is, while the front face surfaces remain smooth on either a planar or continuously curved surface without a step changed in profile, the tips at the corners are built up, or stepped outwardly, on both the side face and top face, as at 84 and 86. This is achieved by not machining the side faces down as far. Note that the face 84 (or 86, as may be) stands outwardly, or proud, of face 26 (or 32 as may be) in a parallel plane thereto, by some offset distance, or raised distance, dt. It has the same reward relief angle, be it $\lambda_1$ or $\lambda_2$. The width of the step, or raised, or proud, portion 88, indicated by numeral 90, may be something on the order of one quarter to one half the half-width distance from the tip to the tooth center-line. This can be expressed as the front or leading cutting edge of the tooth being on two planes, the first plane being that of the center section of the tooth, which is on the same plane as the tooth body, and which is lower than the corner portions by the offset distance dt, as shown in FIG. 2e. The travelwise, or rearward extent of the raised portion, dl, may be of the order of 2 to 5 times the thickness, dt. For example, in a tooth with a nominal overall width measured from tip to tip on a new tooth of 2 inches to 2½ inches, dt may be of the order of 1/16-1/8 inches, and dl may be of the order of ¼ to ½ inches, and may be comparable in size to the width 90 of the stepped portion 88, perhaps lying in the range or ⅔ of that width to the same as that width. The physical significance of these ratios is that the force on the cutting edge, which is applied eccentrically at the outermost edge of the cutting tip, creates a bending moment in the tooth body generally, and in the built-up tip specifically. It is not desirable to have a cutting tip that is a shallow cantilevered beam. When the depth of the built-up portion in the direction of advance is great relative to the size of the outward step, the area of the enlargement placed in shear is large relative to the step, and, because the built-up portion is deeper, the bending moment is reacted over a greater depth of section. The combined effect may tend to lessen the internal stresses in the tooth, and may also give it, in effect, more body to be worn away by friction over time. In one example, as illustrated in tooth 92 of the embodiment of FIG. 5a, the built-up portion 94 extends fully peripherally about all four sides of the tooth. It is thought that tooth 20 may have a self-sharpening feature or tendency in operation.

Figure 3A:
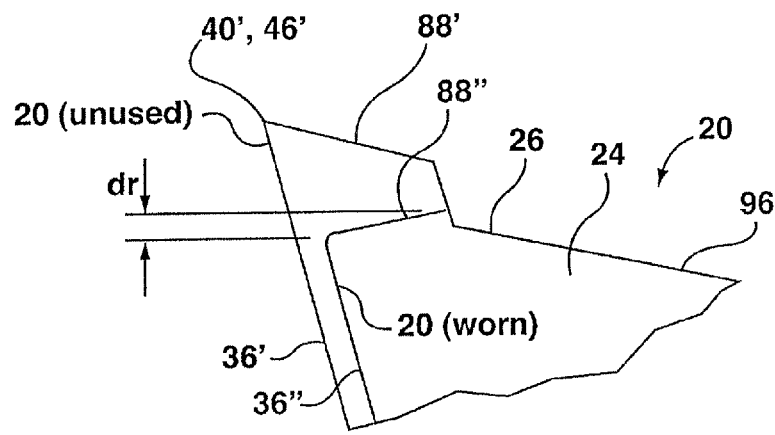
FIG. 3a is a side view detail of the tooth of FIG. 2a in a worn condition.
Figure 3B:
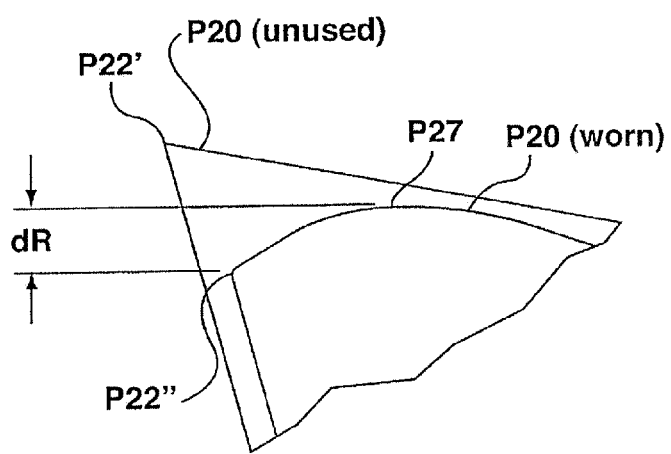
FIG. 3b is a side view detail of the prior art tooth of FIG. 1a in a worn condition.
Figure 3C:
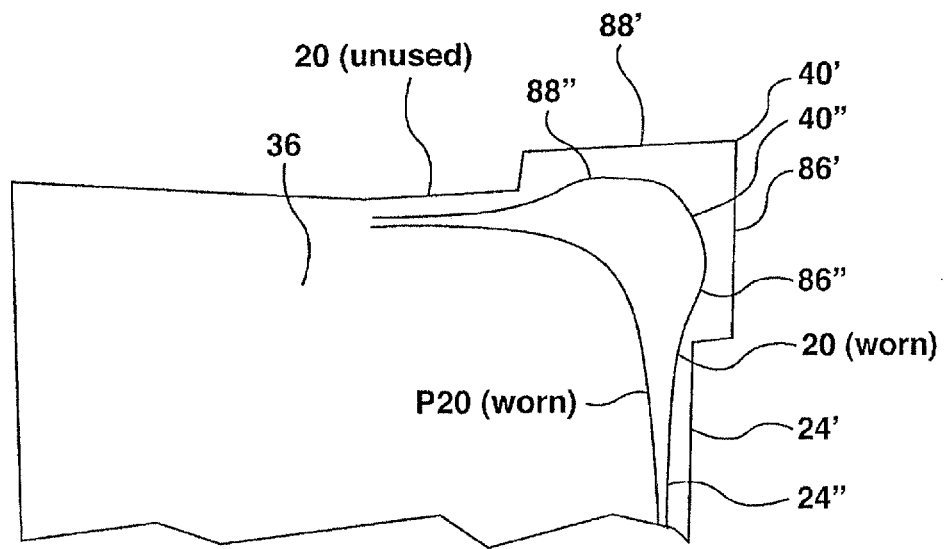
FIG. 3c is a front view detail of the tooth of FIG. 2a in a worn condition.
Figure 3D:
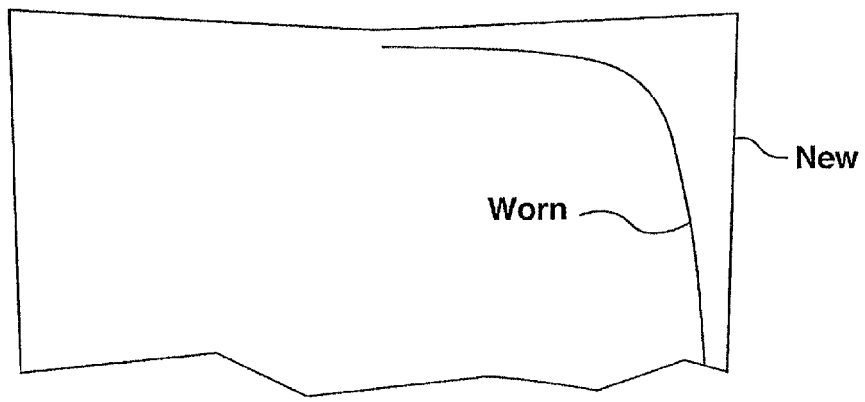
FIG. 3d is a front view detail of the prior art tooth of FIG. 1a in a worn condition.
Figure 4A:
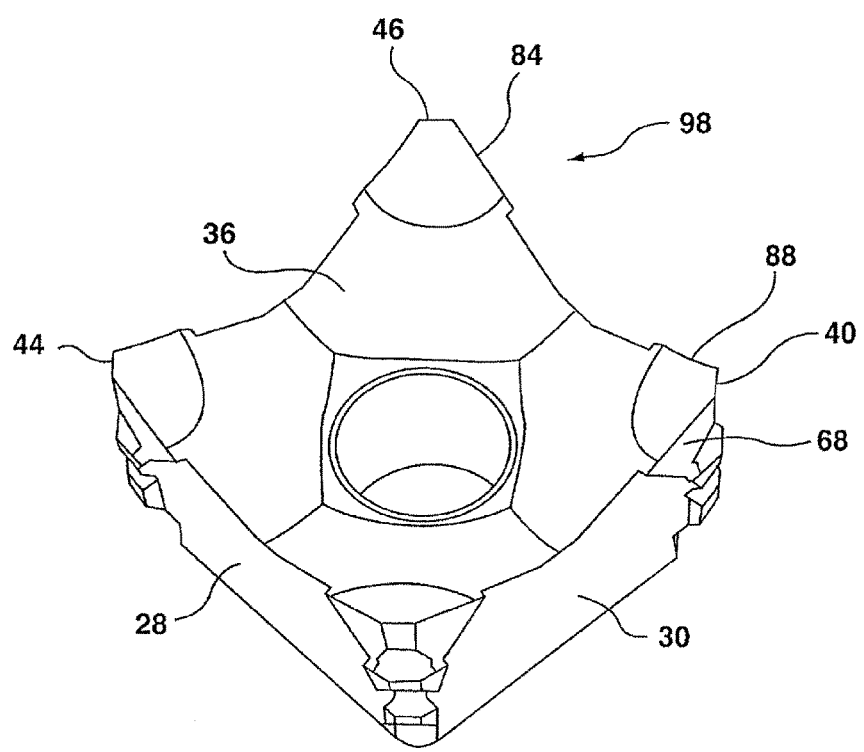
Figure 4B:
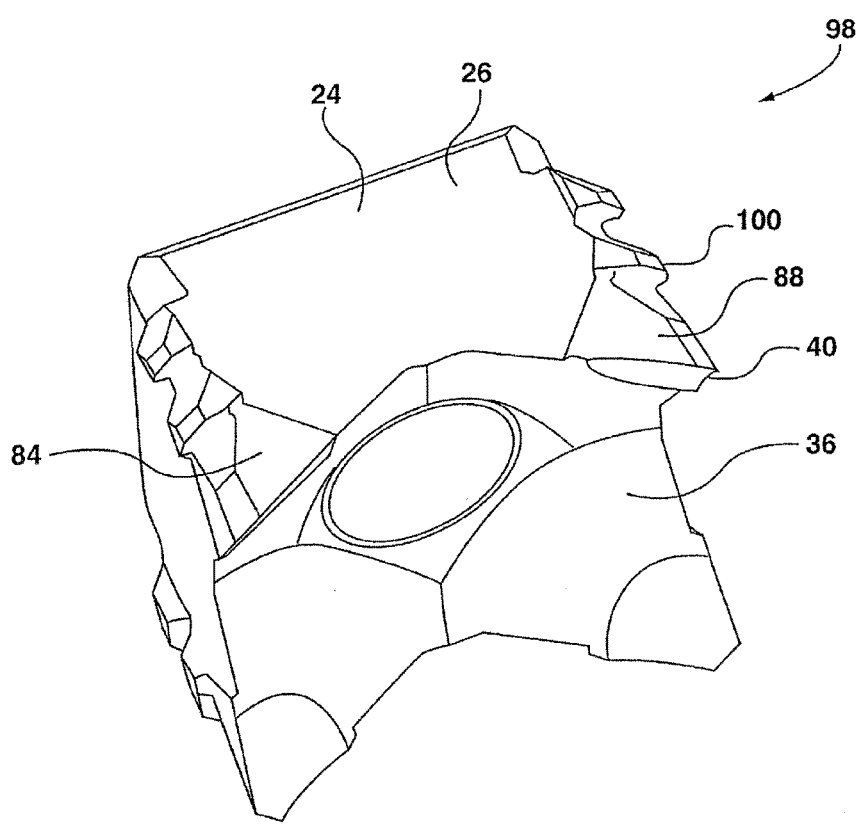
Figure 4C:
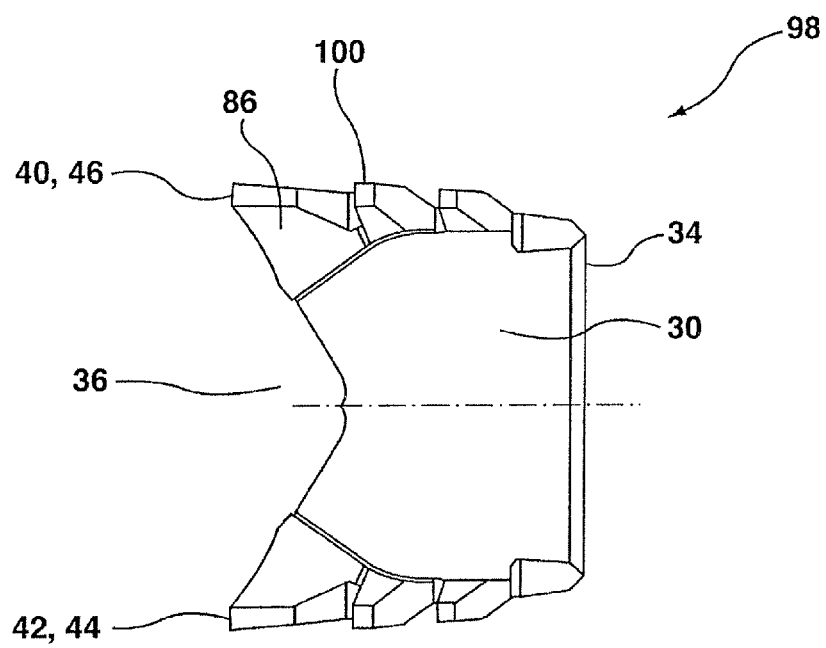
Figure 4D:
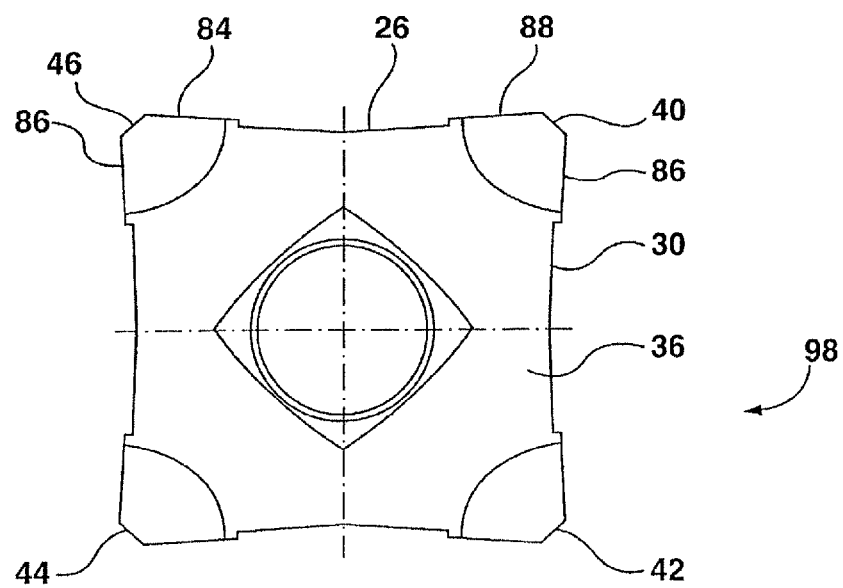

In the illustrations of FIGS. 3a, 3b, 3c, and 3d the inventor provides illustrations of how tooth 20 may tend to work in operation as compared to a conventional tooth as shown in FIG. 1a. In FIG. 3b, the outline of prior art tooth P20, as unused, is indicated by P20', with tip P22' as new. After a time tooth P20 is worn to a condition indicated by the outline of P20", with the front tip worn to the condition indicated at P22". The front face of the tooth has been worn back, as has the side face. The worn cutting tip is shown as being narrower than the broader region rearwardly thereof, indicated at P27. The difference in height between P22" and P27 is indicated as dR. In FIG. 3a, tooth 20 is shown in its unused condition at 40', 46'. Initially tooth 20 cuts as before. However, after a time the corners begin to wear away, wear tending to be greater at the corners than along the center of the cutting edge. This will tend to result in a tooth that begins to approach the shape of a normal, generally square tooth. During this time the leading portion of tooth 20 may still remain larger than, and then latterly be comparable in size to, the trailing, relieved portion 96 that follows immediately behind, as suggested by the worn profile and items 40", 46" and 88". The time period until the corners wear down may be delayed and friction rubbing of the body of tooth 20 more generally during operation may be reduced. The difference in height between the worn tip 40", 46", as may be, and the highest point of the edge, indicated by 88" (taken as being the height difference between the worn front cutting tip and the widest part of the trailing tooth body), is indicated as dr, with dr being shown as smaller than dR. This effect is further shown in FIG. 3c in both the y and z directions, with the 20 (unused) and 20 (worn) profile lines being compared to a P20 (worn) line. The unused cutting edges 86' and 88' wear inward to the worn lines 86" and 88".

Figure 5D:
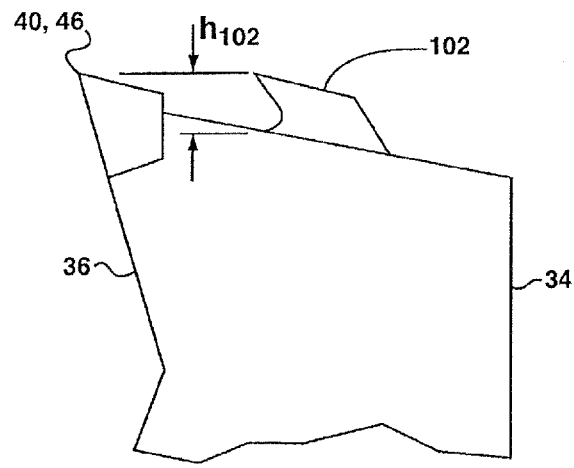
Figure 5E:
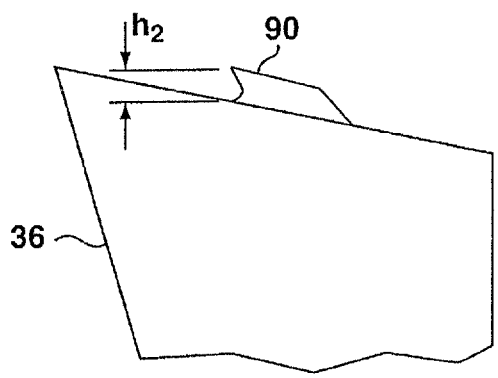
FIG. 5e is a front view detail of a further alternate embodiment of the saw tooth of FIG. 5d.

As noted above, the outer front two cutting tips are susceptible to damage from impact when the teeth strike objects such as rocks and other debris during the felling of trees. This damage can destroy or dull the outer front two cutting tips such that they are no longer sharp and are no longer the outermost parts of the tooth. This may result in inefficient cutting and may require the replacement or rotation of the tooth. However, the stepped-out portions 88 of leading face 36 of the present tooth 20 may be combined with a secondary trailing cutting tip such as item 90 in my co-pending U.S. patent application Ser. No. 12/524,902 filed as PCT/CA 2008/000066 Jan. 11, 2008 and now shown in US Publication US 2010/0011934 published Jan. 21, 2010, the disclosure of which is hereby incorporated by reference, behind, or shielded by, the front cutting tip 40. Such an embodiment of tooth, 98, with the trailing cutting tip identified as 100 is shown in FIGS. 4a to 4d. In some instances of unintentional contact with objects, outermost front cutting tip 40 may be damaged and secondary cutting tip 100 may be left intact and in an undamaged condition. This allows the cutting to continue by way of the secondary cutting tip without having to replace or rotate the tooth as soon as might otherwise be the case. To that extent tooth 98 may tend to be somewhat more tolerant of impact with objects such as rocks and other debris during the felling of trees than it might otherwise be. As indicated in the embodiment of FIG. 5d, the trailing tooth, or secondary cutting tip 102 may also be further built up by an amount corresponding, roughly, to the outward build-up of tips 40, 42, 44 and 46, namely distance dt in both the radial and vertical directions. The contrasting embodiment is seen in FIG. 5e. If the old secondary tooth height $h_2$ was determined as the rearward spacing of the secondary tooth, dx, multiplied by the tangent of the relief angle $\lambda_1$ of the plane of the face 32 (or 24 as may be) of the tooth body, the new secondary tooth depth $h_{102}$ may be approx. $h_2+dt$. (More rigorously the projection of $dt=dt(\sin\psi_1)/\sin(\psi_1-\lambda_1)$. Where $\lambda_1$ is small the difference between numerator and denominator is small, particularly when $\psi_1$ is close to 90 degrees.) A larger secondary tip may tend to have longer life.

Tips 90, 92, 94 and 96 may be made of steel, or they may be made of, or include, ceramic inserts, such as tungsten carbide. Such an embodiment of tooth 120 is shown in my co-pending application, noted above.

As noted above, shank 38 may extend from the mounting end or shoulder 34 in a direction away from cutting end 36, and may seat in a corresponding accommodation, or socket, in the saw blade. The body 24 is typically made of steel. When seen from in front, as in FIG. 2c, and from above as in FIG. 2b, the intersection of the front end 36 with the flat lateral sides form four front or primary cutting edges 41. The intersection of the four forward curved surfaces 86 and the four flat intermediate surfaces 87 and adjacent flat surfaces 89 form four intermediate or secondary cutting edges 103. There are eight curved surfaces made by the milling cutter, joining the flat lateral sides to the eight flat intermediate surfaces.

The recessed front or cutting end 36 is angled toward the direction of rotation of the disc as indicated at angle β (beta). The front end 36 may have a radius such as may encourage a relatively smooth flow of chips from the cutting tips to the gullet (e.g. P26) of the disc. Angle β (beta) may be in the range of 35 to 55 degrees, and, in one embodiment, may be about 45 degrees. The recessed front may also be accomplished by milling four flat faces at an angle β (beta). Tooth 20 may have a concave recess on front end 36, which is turned on a lathe. Alternatively, in other embodiments there may be four flat, angled faces similar to the front face of a Quadco Beaver™ tooth.

Wear plates, or inserts, may be added to encourage longer life of the cutting edges on the leading face of the tooth in abrasive conditions. The wear plates may be made of a hardened material such as tungsten carbide and brazed, soldered or otherwise suitably secured to the seats of the body of tooth. When seen from the direction of advance of the tooth into the wood, the wear plates may generally follow the shape of, or may have a form consistent with, the enlarged, built-out tips of the body of the tooth described herein.

As the tooth wears, due to the multi planes, there is a smaller height difference between the worn front cutting tip and the widest part of the trailing tooth body. This may tend to result in less friction and more efficient cutting. See FIGS. 3a-3d.

In the embodiments described, as compared to conventional teeth, more material is placed at the outer corners that do the majority of the cutting work. This may tend to make the tooth last longer and cut more efficiently. The outer corners of the teeth do the most cutting and wear faster than the center part of the leading cutting edge therefore by having the outer corners of the leading cutting edges on a higher (wider) plane, the outer corners of the leading cutting edge will tend to wear down to the approximate shape of a new conventional tooth thereby providing self sharpening of the leading cutting edge and longer, more efficient tooth life.

Expressed somewhat differently, the outward stepping from the planes of the tooth body more generally permits widening of the tooth without lengthening the tooth along the taper. Lengthening the tooth is not desired since it may tend to increase the bending forces on the mounting bolt or shank.

As described in the context of the embodiment of FIGS. 4a to 4d, the enlarged leading edge tips can also be employed with the trailing or secondary tooth concept of the previous invention (WIPO Patent Application WO/2008/092239) to be enhanced thereby increasing tooth life. The height of the secondary cutting tips is limited by height of leading cutting edge or kerf. This is because if the height of the secondary cutting tip was higher (wider) than the leading cutting edge, the secondary cutting tip would be re-cutting tree fibers and cut less efficiently. Thus larger, outwardly stepped cutting tips can be used with or without secondary cutting tips. Also, as noted, as the invention wears the tooth may tend longer to retain cutting tips at the corners of the tooth that are wider than the middle of the tooth, which may tend to result in less friction and more efficient cutting.

In another embodiment, the tooth may be non-planar or multi-planar. For example in the embodiment of FIGS. 5b and 5c a tooth 120 has stepped out corners 122 the protrude proud of the planes of the respective side faces, but rather than employing a linear cutting edge of a planar cutter side wall, tooth 120 employs serrations 124 on the leading cutting edge. The serrated edge can be only at the outer corners of the front cutting edge or all along the front cutting edge.

The tooth may have pointed corners of the leading cutting edge as shown in FIGS. 2a-2f, or may employ chamfered or radiused corners. The enlarged corner tips can be used with or without the features of the previously describes teeth of WIPO Patent Application WO/2008/092239 as shown in FIGS. 4a-4d. The teeth herein may be used with any shape front faces such as curved or concave or flat faces or any combination of the two. The teeth herein may be used with carbide hardened steel or carbide teeth or hardened inserts, e.g., carbide inserts. For example, in FIG. 5a there is a tooth 130 that has a carbide insert or inserts 132 that extend proud of the tapered trailing faces 134, 136, 138, by a step distance dt. The stepped-out tips are identified as 140. As noted above, in this instance the cutting edge of the enlarged portion may be extended along the complete leading cutting edge as shown at 142 in FIG. 5a, to result in a stepped or multi-plane body, in which the cutting edge is in a stepped out plane, as at 144, and the respective trailing parts or faces of the tooth are on respective other planes, as at 146, tapering rearwardly as in the other examples.

In each of the embodiments described herein, the initial or base geometry of the tooth body is of a truncated tapering section. The body tapers from a broad front at the leading or cutting edge of the tooth, to a narrowed rear, or trailing, end at which the tooth body seats on the feller-buncher blade tooth holder. This is so whether the tooth has a shank or not. Most often the tapered body has the form of a squat, square-sectioned pyramid, though this need not necessarily be so. The body has a plurality of teeth, most usually four, but possibly as few as two or three, and perhaps more than four teeth, and has one means or another to permit the tooth body to be rotated about the axis defined by the direction of advance of the tooth. The sides of the tapering body are typically planar, (although this need not necessarily or precisely be the case), and, given the tapering nature of the body, are generally trapezoidal in shape. The front of the tooth may be curved on a surface of curvature such as a paraboloid or other body of revolution, or the leading faces of the tips may be substantially flat, typically generally triangular, and angled rearwardly and away toward the center of the tooth.

When viewed from in front, each tip of the tooth body has first and second adjacent flanks, those flanks being defined by the line of intersection of the leading face of the tooth with the planes (or such other tapering surface as may be) of the sides of the body, the tip being at the intersection of those lines. The corner of the tooth where two adjoining side faces meet may be chamfered or radiused.

The flanks of the tooth, and hence the tip itself, are each built-out, or enlarged, or bulge outwardly, in a direction normal to the respective side faces of the tooth. If the direction of travel is the x-direction, and the tooth has a pyramidal cross-section in which the y-direction is parallel to two sides of the tooth, and the z-direction is parallel to two other sides of the tooth, the corners are built-up, or enlarged, or bulge, or are "oversized" in both the y and z directions at each tip, beyond the locus at which the surface of the main portion of the respective sides would otherwise meet the surface of the front face of the tooth. The body or bulk of the enlarged tip portions extends rearwardly, and has an outer face that is parallel to the taper of the tooth body more generally. The enlarged portion has an extent in the rearward direction that is greater than, and possibly quite substantially greater than, the step in the tooth profile as viewed from the front of the tooth. In the embodiments described, the step in the tooth does not diverge from, or interrupt, the continuity of the forward surface of the tooth, be it planar or on a curvature.

Expressed differently, the tooth has a body with a mounting end and a front end distant from the mounting end. The body is wider at the front end than at the mounting end. The tooth body has a four sides defining a generally pyramidal form between the front end and the rear end. The first side lies in a first surface, the second side lies in a second surface. The first surface and the second surface intersect along a first (possibly imaginary in part) line of intersection. The front end of the tooth defines a third surface. The first surface and the third surface intersect at a second constructed line of intersection. The second surface and the third surface intersect at a third constructed line of intersection. The body has at least a first cutting tip and a second cutting tip located at the front end. The first, second, and third construction lines of intersection may intersect at, and extend away from, the theoretical point of the first tip (i.e., if neither radiused nor chamfered). The body has a region of enlargement adjacent the first tip. In the region of enlargement the third surface extends outwardly beyond the second constructed line of intersection and the third constructed line of intersection. As seen parallel to the direction of forward travel, in the region of enlargement the third surface extends beyond the first surface a first projected distance. In the region of enlargement the third surface extends beyond the second surface a second projected distance. In a symmetrical tooth, as shown, these distances are equal, although that need not necessarily be so. The enlarged region extends rearwardly from the third surface a rearward distance parallel to the first constructed line of intersection greater than twice any of (a) the first projected distance; and (b) the second projected distance. The vertex, or (theoretical) line of intersection of each planar side and the front face (which may be formed on a body of revolution) extends on an arc or curvy, or generally V-shaped line across the tooth from the first tip to the second tip. The enlarged region associated with the first tip extends along the second vertex a distance that is at least ⅛ of the overall arc length of the line, or expressed differently, at least ¼ of the way to the centerline of the tooth, and possibly as much as half way to the centerline. Each of the first and second projected distances may be at least 1/16".

Still differently, the saw blade tooth has a tooth body having a generally square pyramidal shape including a front end, a rear end, and first, second, third and fourth sides lying in respective first, second, third and fourth planes. The rear end has a mounting removably engageable with the tooth seat and rotatable about the direction of forward travel to a plurality of different seating orientations. Each of the first, second, third, and fourth sides is substantially trapezoidal in shape and tapers in width from the front end to the rear end. A first tip is formed at the meeting of the first and second sides and the front end. A second tip is formed at the meeting of the second and third sides and the front end. A third tip is formed at the meeting of the third and fourth sides and the front end. A fourth tip is formed at the meeting of the fourth and first sides and the front end. The front end is rearwardly sloped away from each of the first, second, third, and fourth tips. The tooth body has a central axis of symmetry extending longitudinally the direction of forward travel. A first transverse axis lies in a plane perpendicular to the first and third sides. A second transverse axis lies in a plane perpendicular to the second and fourth sides. The first and second transverse axes are perpendicular to the central axis of symmetry and define a cross-sectional plane of the tooth body. Each of the first, second, third, and fourth tips has an associated first, second, third and fourth region of local enlargement. The first region of local enlargement includes material that extends transversely proud of (i.e., beyond) the first and second planes.

Various embodiments have been described in detail. It will be appreciated that the various features shown and described herein may be mixed and matched in such combinations and in such manner as may be appropriate. Since changes in and or additions to the above-described examples may be made without departing from the nature, spirit or scope of the invention, the invention is not to be limited to those details.

The invention claimed is:

1. A saw tooth releasably mountable to a tooth seat of a circular saw disc of a feller head, and when so mounted, said tooth being operable to cut wood when driven in a direction of forward travel, said tooth comprising:

a body with a mounting end and a front end distant from the mounting end;

said body having a pyramidal shape and being wider at said front end than at said mounting end;

said body having at least a first cutting tip and a second cutting tip located at said front end, and an intermediate edge portion therebetween;

said body being repositionable on the tooth seat by angular re-orientation about said direction of forward travel; and as viewed from in front, looking rearwardly along the direction of forward travel, said first cutting tip being stepped to project outwardly relative to said intermediate edge portion, transversely to said direction of forward travel.

2. A saw tooth releasably mountable to a tooth seat of a circular saw disc of a feller head, and when so mounted, said tooth being operable to cut wood when driven in a direction of forward travel, said tooth comprising:

a body with a mounting end and a front end distant from the mounting end;

said body being wider at said front end than at said mounting end;

said body having at least a first cutting tip and a second cutting tip located at said front end;

said body being repositionable on the tooth seat by angular re-orientation about said direction of forward travel; and as viewed from in front, looking rearwardly along the direction of forward travel, said first tip being stepped outwardly to project from said body transversely to said direction of forward travel;

said tooth body having a plurality of sides defining a generally pyramidal form between said front end and said mounting end, said plurality of sides including a first side and a second side, said first side lying in a first surface, said second side lying in a second surface;

said first surface and said second surface intersecting along a first line of intersection;

said front end of said tooth defining a third surface;

said first surface and said third surface intersecting at a second line of intersection;

a portion of said second line of intersection defining a cutting edge intermediate said first and second cutting tips;

said second surface and said third surface intersecting at a third line of intersection;

said body having a first region adjacent said first tip; and in said first region said third surface extends outwardly beyond said second line of intersection and said third line of intersection.

3. The tooth of claim 2 wherein, as seen parallel to said direction of forward travel:

in said first region said third surface extends beyond said first surface a first projected distance;

in said first region said third surface extends beyond said second surface a second projected distance; and said first region extends rearwardly from said third surface a rearward distance parallel to said first line of intersection at least twice any of (a) said first projected distance; and (b) said second projected distance.

4. The tooth of claim 2 wherein, as seen parallel to said direction of forward travel:

in said first region said third surface extends beyond said first surface a first projected distance;

in said first region said third surface extends beyond said second surface a second projected distance; and said first region extends rearwardly from said third surface a rearward distance parallel to said first line of intersection; and said rearward distance is in the range of 2 to 5 times the greater of said first projected distance and said second projected distance.

5. The tooth of claim 2 wherein said tooth has a second region associated with said second cutting tip; said second line of intersection deviates rearwardly between said first and second cutting tips; and said second line of intersection has a medial portion between said first and second cutting tips at which said third surface terminates at said second line of intersection.

6. The tooth of claim 1 wherein, as viewed from in front, said tooth has a crenellated shape.

7. The tooth of claim 1 wherein said tooth has an enlarged region at each of said first cutting tip and said second cutting tip.

8. The tooth of claim 1 wherein said body has a secondary cutting tip mounted rearwardly of said first cutting tip.

9. The tooth of claim 2 wherein said second line of intersection extends across said tooth from said first tip to said second tip; and said first region associated with said first tip extends along said second line of intersection a distance that is at least 1/8 of the overall arc length of said second line of intersection.

10. The tooth of claim 1 wherein any tip of said tooth includes a wear insert mounted thereto, said wear insert conforming to any associated first region.

11. The tooth of claim 2 wherein said tooth has a third cutting tip and a fourth cutting tip, each of said first, second, third, and fourth cutting tips having respective third and fourth regions associated therewith, and said body is substantially square in cross-section perpendicular to said direction of forward travel, and said first, second, third and fourth cutting tips are spaced apart from each other such that, as viewed from said direction of forward travel there are notches formed between respective pairs thereof.

12. The tooth of claim 11 wherein said tooth has secondary cutting tips mounted in respective trailing positions rearwardly of each of said first, second, third and fourth cutting tips.

13. The tooth of claim 11 wherein said first region is rearwardly relieved on planes parallel to respective planes of said first and second surfaces.

14. The tooth of claim 3 wherein each of said first and second projected distances is at least 1/16".

15. The tooth of claim 1 wherein:

said tooth body has a plurality of sides between said front end and said mounting end, said plurality of sides including a first side and a second side, said first side lying in a first surface, said second side lying in a second surface;

said first surface and said second surface intersecting along a first line of intersection;

said front end of said tooth defining a third surface;

said first surface and said third surface intersecting at a second line of intersection;

said second surface and said third surface intersecting at a third line of intersection;

said body having a first region adjacent said first tip; and in said first region, said third surface extends beyond said first surface a first projected distance that is at least 1/16";

in said first region said third surface extends beyond said second surface a second projected distance that is at least 1/16"; and said first region extends rearwardly from said third surface a rearward distance parallel to said first line of intersection a distance in the range of 2 to 5 times each of (a) said first projected distance; and (b) said second projected distance; and
said intermediate cutting edge deviates rearwardly relative to said pair of first and second cutting tips; and
said tooth has a crenellated shape.

16. A rotatable saw blade tooth for use on a forestry feller buncher saw blade, and mountable to a tooth seat thereof, and when mounted on said tooth seat, being movable in a direction of forward travel as the saw blade turns, wherein said saw blade tooth comprises:
a tooth body having a generally square pyramidal shape including a front end, a rear end, and first, second, third and fourth sides lying in respective first, second, third and fourth planes;
said rear end having a mounting removably engageable with the tooth seat and rotatable about the direction of forward travel to a plurality of different seating orientations;
each of said first, second, third, and fourth sides being substantially trapezoidal in shape and tapering in width from said front end to said rear end;
a first tip being formed at the meeting of said first and second sides and said front end;
a second tip being formed at the meeting of said second and third sides and said front end;
a third tip being formed at the meeting of said third and fourth sides and said front end;
a fourth tip being formed at the meeting of said fourth and first sides and said front end;
said front end being rearwardly sloped away from each of said first, second, third, and fourth tips;
said tooth body having a central axis of symmetry extending longitudinally along said direction of forward travel, a first transverse axis perpendicular to said central axis of symmetry, said first transverse axis lying in a first plane bisecting said first and third sides, and a second transverse axis lying in a plane perpendicular to said central axis of symmetry, said second transverse axis lying in a second plane bisecting said second and fourth sides;
each of said first, second, third, and fourth tips having an associated first, second, third and fourth region; and
said first region including material extending transversely proud of adjacent regions of said tooth in directions along said first and second axes such that said first tip region bulges outwardly relative to said front end when said tooth is viewed from in front.

17. The rotatable saw blade tooth of claim 16 wherein a secondary cutting tip is mounted in a trailing position with respect to each of said tips.

18. The rotatable saw blade tooth of claim 16 wherein each of said first, second, third, and fourth regions has a forward face; and said respective forward faces and said front end of said tooth body form one smooth, continuous, surface.

19. The rotatable saw blade tooth of claim 16 wherein each of said first, second, third, and fourth regions extends at least one eighth of the tip-to-tip distance across said tooth and at least twice as far rearwardly in said direction along said central axis of symmetry.

20. The rotatable saw blade tooth of claim 16 wherein:
each of said first, second, third and fourth regions extends beyond an associated pair of first, second, third, and fourth planes a projected distance that is at least $1/16"$;
said first region extends rearwardly a rearward distance in the range of 2 to 5 times said projected distance; and
there is a respective cutting edge that extends between each adjacent pair of said tips, each said cutting edge deviates rearwardly between its respective pair of tips; and each said cutting edge has a medial portion between its associated tips at which said front end terminates such that, when viewed toward said front end along said direction of forward travel said tooth has a crenelated shape.

21. A saw tooth releasably mountable to tooth seat of a circular saw disc of a feller head, and when so mounted, said tooth being operable to cut wood when driven in a direction of forward travel, said tooth comprising:
a body with a mounting end and a front end distant from the mounting end;
said body being wider at said front end than at said mounting end;
said body having at least a first cutting tip and a second cutting tip located at said front end;
said body being repositionable on the tooth seat by angular re-orientation about said direction of forward travel; and
as viewed from the front of the tooth looking rearwardly along the direction of forward travel, said first tip extending transversely proud of said front end generally, and
said first tip presents an outwardly serrated edge as viewed from the front of the tooth.

22. The saw tooth of claim 1 wherein said first tip and said second tip each have the form of a corner that is stepped transversely outwardly of said pyramidal shape, and said tooth has a notch between said corners, whereby said front end of said tooth has a crenellated shape.

23. The saw tooth of claim 1 wherein:
said pyramidal shape has a first side, a second side, a third side and a fourth side;
said first tip is bordered by said first side and said second side; and
said first tip stands outwardly beyond said first side and said second side.

24. The saw tooth of claim 23 wherein:
said tooth has a third tip and a fourth tip;
said second tip is bordered by said second side and said third side;
said third tip is bordered by said third side and said fourth side;
said fourth tip is bordered by said fourth side and said first side;
said second tip stands outwardly beyond said second and third sides;
said third tip stands outwardly beyond said third and fourth sides; and
said fourth tip stands outwardly beyond said fourth and first sides.

25. The saw tooth of claim 23 wherein said first, second, third and fourth sides are substantially planar.

26. The saw tooth of claim 25 wherein there is a trailing cutting tip mounted to said body rearwardly of said first tip, said trailing cutting tip being bordered by said first side and said second side; and said trailing cutting tip also extends outwardly proud of said first side and said second side.

27. The saw tooth of claim 25 wherein there is a trailing cutting tip mounted rearwardly of each of said first, second, third, and fourth tips, and each said trailing cutting tip stands outwardly of the respective two bordering planar sides of said pyramid shape.

28. The tooth of claim 2 wherein said tooth also has a third cutting tip and a fourth cutting tip; and said tooth has respective second, third and fourth regions at each of said first, second, third, and fourth cutting tips, said first, second, third, and fourth cutting tips all extending outwardly proud of said pyramidal shape.

29. The tooth of claim 2 wherein said body has a secondary cutting tip mounted rearwardly of said first cutting tip.

30. The tooth of claim 2 wherein said second line of intersection extends across said tooth from said first tip to said second tip; and said first region associated with said first tip extends along said second line of intersection a distance that is at least ⅛ of the overall arc length of said second line of intersection.

31. The tooth of claim 2 wherein any tip of said tooth includes a wear insert mounted thereto.

32. The tooth of claim 21 wherein said tooth also has a third cutting tip and a fourth cutting tip and said tooth has respective first, second, third, and fourth regions at each of said first, second, third, and fourth cutting tips, and each of said first, second, third and fourth regions presents an outwardly serrated edge as viewed from the front of the tooth.

33. The tooth of claim 21 wherein said body has a secondary cutting tip mounted rearwardly of said first cutting tip.

* * * * *